(12) United States Patent
Yun et al.

(10) Patent No.: US 9,163,443 B2
(45) Date of Patent: Oct. 20, 2015

(54) LINEAR CENTER RAIL STRUCTURE FOR SLIDING DOOR

(71) Applicant: Hyundai Motor Company, Seoul (KR)

(72) Inventors: Hyung In Yun, Incheon (KR); Young Jin Kwon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 39 days.

(21) Appl. No.: 13/828,529

(22) Filed: Mar. 14, 2013

(65) Prior Publication Data

US 2014/0157550 A1     Jun. 12, 2014

(30) Foreign Application Priority Data

Dec. 7, 2012   (KR) ........................ 10-2012-0141915

(51) Int. Cl.
| | |
|---|---|
| *E05D 15/06* | (2006.01) |
| *B60J 5/06* | (2006.01) |
| *E05D 15/10* | (2006.01) |
| *B60J 5/04* | (2006.01) |

(52) U.S. Cl.
CPC ............ *E05D 15/0608* (2013.01); *E05D 15/10* (2013.01); *B60J 5/0472* (2013.01); *E05D 2015/1031* (2013.01); *E05Y 2900/531* (2013.01); *Y10T 16/379* (2015.01)

(58) Field of Classification Search
CPC ..... E05D 15/06; E05D 15/0608; E05D 15/10; E05D 2015/1031; E05Y 2900/531; Y10T 16/379; B60J 5/0472; B60J 5/0479
USPC ................................. 296/146.11, 155, 146.12
See application file for complete search history.

(56) References Cited

U.S. PATENT DOCUMENTS

| | | | |
|---|---|---|---|
| 6,036,257 A * | 3/2000 | Manuel .......................... | 296/155 |
| 7,658,438 B1 | 2/2010 | Elliott et al. | |
| 2003/0145524 A1 | 8/2003 | Ihashi | |
| 2006/0049667 A1* | 3/2006 | Suzuki ...................... | 296/187.12 |
| 2009/0230721 A1* | 9/2009 | Rusnak ...................... | 296/146.5 |
| 2010/0078961 A1 | 4/2010 | Takaya et al. | |
| 2011/0126466 A1 | 6/2011 | Adachi et al. | |

FOREIGN PATENT DOCUMENTS

| | | |
|---|---|---|
| JP | 62-152823 A | 9/1987 |
| JP | 62-171315 U | 10/1987 |

(Continued)

OTHER PUBLICATIONS

Notice of Allowance Korean Patent Application No. 10-2012-0141915 dated Jun. 27, 2014.

*Primary Examiner* — Glenn Dayoan
*Assistant Examiner* — Melissa A Black
(74) *Attorney, Agent, or Firm* — McDermott Will & Emery LLP (57) ABSTRACT

A linear center rail structure for a sliding door includes a linear center rail, a roller part, a base, and an arm. The linear center rail is disposed on a side outer panel of a vehicle. The roller part is guided by the center rail, slid along the center rail, and has hinge holes formed at an end portion thereof. The base is fixed to a sliding door panel and has slots formed in a pop-up direction of the sliding door panel. The arm has one end at which a first hinge shaft rotatably coupled to the hinge holes of the roller part is disposed and the other end at which a second hinge shaft fitted into the slots of the base to thereby be slidably and rotatably coupled to the base is disposed.

5 Claims, 9 Drawing Sheets

(56) References Cited

FOREIGN PATENT DOCUMENTS

| | | |
|---|---|---|
| JP | 2001-317269 A | 11/2001 |
| JP | 2003-214015 A | 7/2003 |
| JP | 2003-227270 A | 8/2003 |
| KR | 10-2005-0119816 A | 12/2005 |
| KR | 10-2005-0120479 A | 12/2005 |

* cited by examiner

LINEAR CENTER RAIL STRUCTURE FOR SLIDING DOOR

CROSS-REFERENCE TO RELATED APPLICATION

This application is based on and claims benefit of priority to Korean Patent Application No. 10-2012-0141915, filed on Dec. 7, 2012 in the Korean Intellectual Property Office, the entire contents of which are hereby incorporated by reference.

TECHNICAL FIELD

The present inventive concept relates to a sliding door, and more particularly, to a linear center rail structure capable of securing dwelling ability, improving operability in opening or closing a sliding door, and easily managing quality by configuring a center rail of the sliding door in a linear form.

BACKGROUND

A sliding door used as a side door of a van is opened or closed while being slid frontward and rearward along a rail of a vehicle panel.

Figure 1:
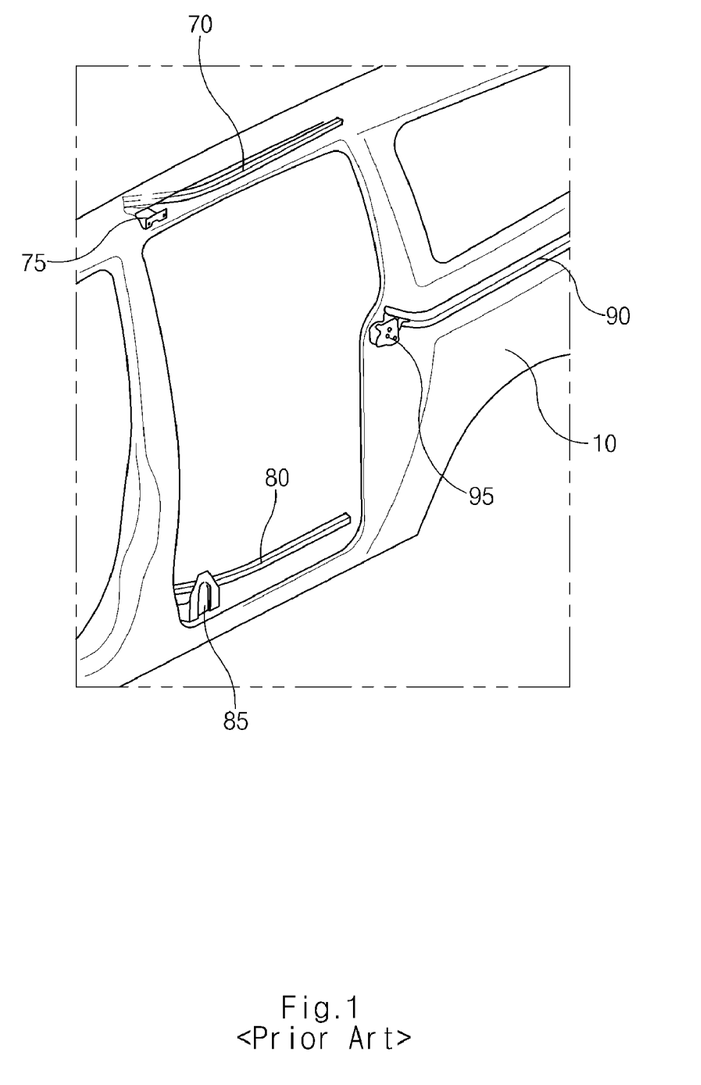
FIG. 1 is a view showing a state in which a top rail, a bottom rail, and a center rail are mounted on a side outer panel according to the prior art.
Figure 2:
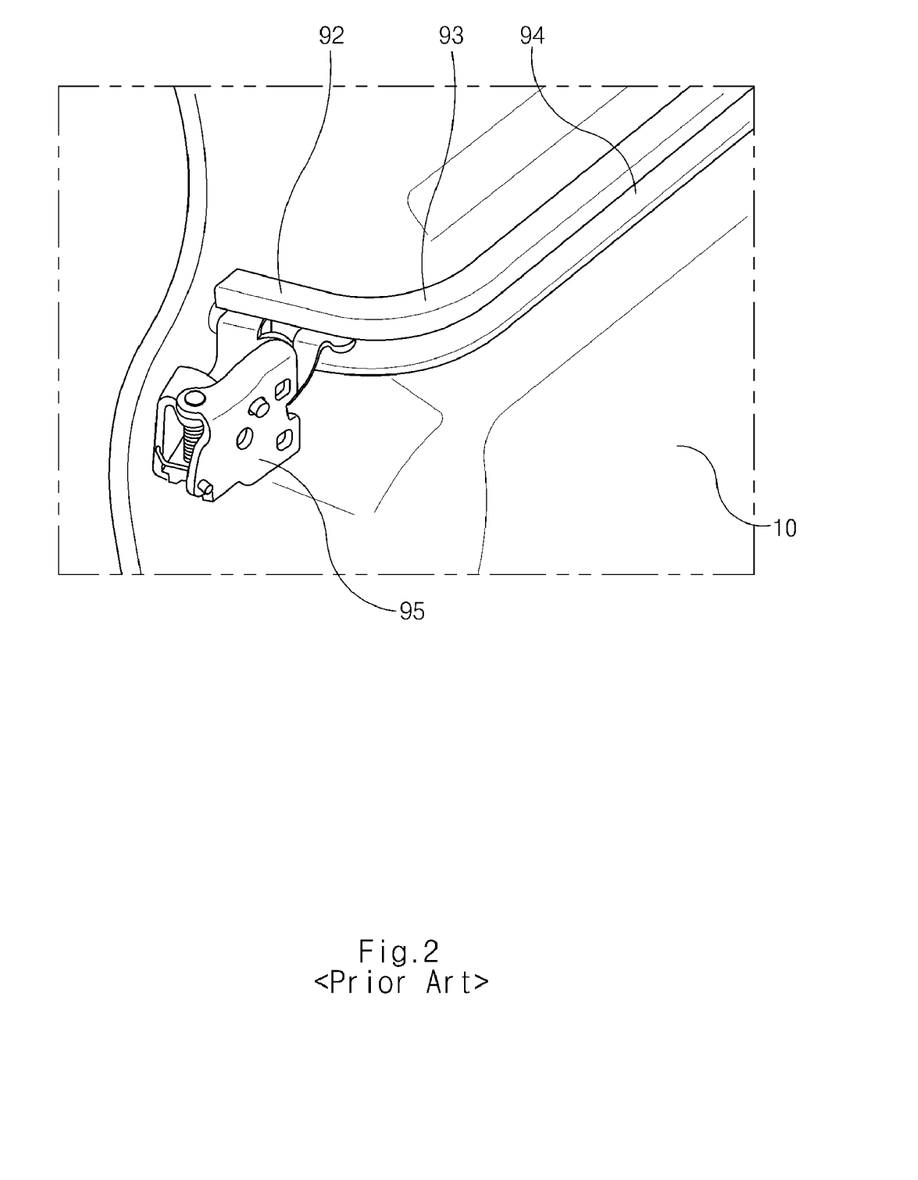
FIG. 2 is an enlarged view of a center rail mounting part of FIG. 1.

FIG. 1 is a view showing a state in which a top rail, a bottom rail, and a center rail are mounted on a side outer panel according to the prior art; and FIG. 2 is an enlarged view of a center rail mounting part of FIG. 1.

A rail structure for a sliding door according to the prior art will be described with reference to FIGS. 1 and 2. The front, which is a position at which the sliding door is closed, of a side outer panel 10 is installed with a top rail 70 and a bottom rail 80, and a side surface of the side outer panel 10 is installed with a center rail 90 lengthily extending from the position at which the sliding door is closed to the rear of the side outer panel 10.

The top rail 70, the bottom rail 80, and the center rail 90 have a top roller 75, a bottom roller 85, and a center roller 95 slidably coupled thereto, respectively. The top roller 75, the bottom roller 85, and the center roller 95 are fixed to a sliding door panel.

However, as shown in FIG. 2, the center rail according to the prior art is configured of a linear part 94, a curved part 93, and an inwardly directed part 92. Here, since the inwardly directed part 92 and the curved part 93 are formed in a left and right direction of a vehicle, the center roller 95 moves in the left and right direction of the vehicle in the inwardly directed part 92 and the curved part 93. Therefore, when a user wants to open the sliding door, the user should pop up the sliding door while pushing the sliding door in the left and right direction and then slide the sliding door rearward.

However, in the center rail of the sliding door according to the prior art as described above, the curved part 93 excessively invades the interior of the vehicle to deteriorate dwelling ability. Moreover, since an operation direction of a handle and an opening or closing direction of the sliding door do not coincide with each other at the inwardly directed part and the curved part to disperse handle operation force, operability is deteriorated. Furthermore, since dispersion of a cross section of a curved bent part is large in a process of bending the curved part of the center rail, it is difficult to secure good quality.

SUMMARY

Accordingly, the present inventive concept has been made to solve the above-mentioned problems occurring in the prior art while advantages achieved by the prior art are maintained intact.

An aspect of the present inventive concept relates to a linear center rail structure for a sliding door capable of securing operation reliability by developing an operation mechanism capable of allowing the sliding door to be slide opened or closed in spite of using a center rail including only a linear part without a curved part and an inwardly directed part to satisfy durability and operability in opening or closing of the sliding door.

An aspect of the present inventive concept encompasses a linear center rail structure for a sliding door, including: a linear center rail installed on a side outer panel of a vehicle; a roller part guided by the center rail, slid along the center rail, and having hinge holes formed at an end portion thereof; a base fixed to a sliding door panel and having slots formed in a pop-up direction of the sliding door panel; and an arm having one end at which a first hinge shaft rotatably coupled to the hinge holes of the roller part is formed and the other end at which a second hinge shaft fitted into the slots of the base to thereby be slidably and rotatably coupled to the base is formed.

The center rail may have a stopper fixed to an end portion thereof, wherein the stopper defines a limitation of sliding movement of the roller part when the sliding door is at a pop-up position and a closed position.

The stopper may be provided with stopping grooves receiving the first hinge shaft of the arm therein to receive the first hinge shaft in the stopping grooves when the sliding door is at the pop-up position and the closed position, thereby defining the limitation of the sliding movement of the roller part.

An inner side of the first hinge shaft of the arm may be provided with a penetration part in order to prevent interference between the arm and the stopping grooves when the first hinge shaft is rotated in a first direction during a period in which the sliding door moves from the pop-up position to the closed position.

The slots may be formed so as to have an inclined angle rearward in a left and right direction of the sliding door.

The first hinge shaft of the arm may be provided with a hook, and an end portion of the center rail may be provided with the hooked groove, such that during a period in which the sliding door moves from a pop-up position to a closed position, the first hinge shaft is rotated in a first direction to allow the hook to be fitted into the hooked groove, and during a period in which the sliding door moves from the closed position to the pop-up position, the first hinge shaft is rotated in an opposite direction to the first direction to allow the hook to exit from the hooked groove.

BRIEF DESCRIPTION OF THE DRAWINGS

The foregoing and other features of the inventive concept will be apparent from more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION OF THE PREFERRED EMBODIMENTS

Examples of the present inventive concept will be described below in more detail with reference to the accompanying drawings. The examples of the present inventive concept may, however, be embodied in different forms and should not be construed as limited to the examples set forth herein. Like reference numerals may refer to like elements throughout the specification.

Hereinafter, an exemplary embodiment of the present inventive concept will be described in detail with reference to the accompanying drawings.

Figure 3:
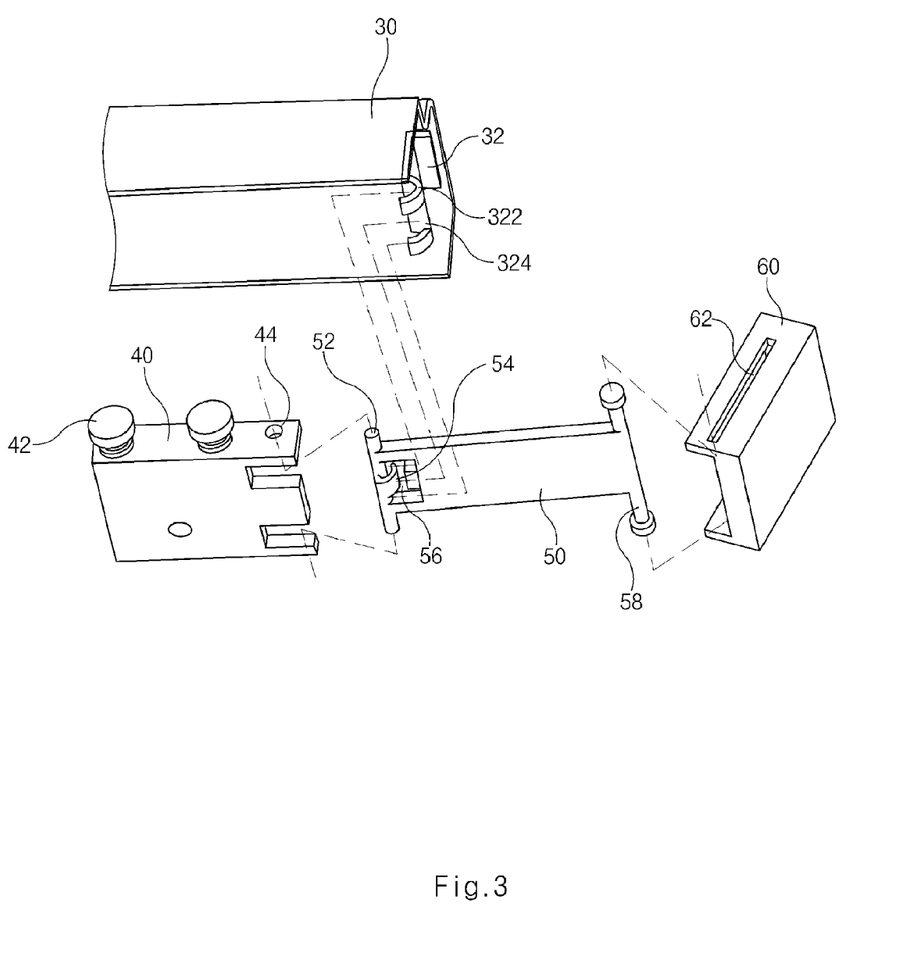
FIG. 3 is an exploded perspective view of a linear center rail structure according to an exemplary embodiment of the present inventive concept.

FIG. 3 is an exploded perspective view of a linear center rail structure according to an exemplary embodiment of the present inventive concept.

Referring to FIG. 3, the linear center rail structure for a sliding door according to the exemplary embodiment of the present inventive concept may include a linear center rail 30 installed on a side outer panel 10 (see FIG. 1) of a vehicle. An end portion of the linear center rail 30 is installed with a stopper 32 on which stopping grooves 322 and a hooked groove 324 are formed.

In addition, the linear center rail structure for a sliding door according to an exemplary embodiment of the present inventive concept may include a roller part 40 (see FIG. 4) guided by the center rail 30 and slid along the center rail 30. Two guide rollers 42 slid on the center rail 30 are attached to each of upper and lower portions of the roller part 40. In addition, the roller part 40 may include hinge holes 44 each formed at upper and lower portions of an end portion thereof.

Further, the linear center rail structure for a sliding door according to the exemplary embodiment of the present inventive concept may include a base 60 fixed to a sliding door panel 20 and having slots 62 formed in a pop-up direction of the sliding door panel. The slots 62 may be slightly obliquely formed from an inner side of the front of the vehicle toward an outer side of the rear of the vehicle.

Further, the linear center rail structure for a sliding door according to an exemplary embodiment of the present inventive concept may include an arm 50 (see FIG. 4) having one end at which a first hinge shaft 52 rotatably coupled to the hinge holes 44 of the roller part 40 is formed and the other end at which a second hinge shaft 58 fitted into the slots 62 of the base 60 to thereby be slidably and rotatably coupled to the base 60 is formed. The first hinge shaft 52 may be provided with a hook 54, and an inner side of the first hinge shaft 52 of the arm 50 may be provided with a penetration part 56 (see FIG. 4).

A coupled structure between the roller part 40, the arm 50, and the base 60 will be described below. The first hinge shaft 52 of the arm 50 is hinge-coupled to the hinge holes 44 formed at the end portion of the roller part 40, such that the arm 50 is connected to the roller part 40 so as to be rotatable with respect to the roller part 40 around the first hinge shaft 52, and the second hinge shaft 58 of the arm 50 is fitted into the slots 62 of the base 60, such that the arm 50 is connected to the base 60 so as to be rotatable with respect to the base 60 at any position of the slots 62 while being slidable in a length direction of the slots 62.

In addition, the stopper 32 may be fixed to the end portion of the linear center rail. The stopper grooves 322 receiving the first hinge shaft 52 hinge-coupled to the roller part therein when the roller part moves to the frontmost side along the center rail may be formed on the stopper 32. The hooked groove 324 may be formed between the stopping grooves 322 so that the hook 54 formed at a central portion of the first hinge shaft 52 is fitted thereinto while facing an outer surface thereof.

In addition, the arm 50 may include the penetration part 56 formed by perforating a portion at which interference is generated in the arm 50 in order to avoid interference between a member of the stopping groove 322 and a member of the arm 50 when the first hinge shaft 52 is rotated in a state in which the first hinge shaft 52 is received in the stopping groove 322.

Figure 4:
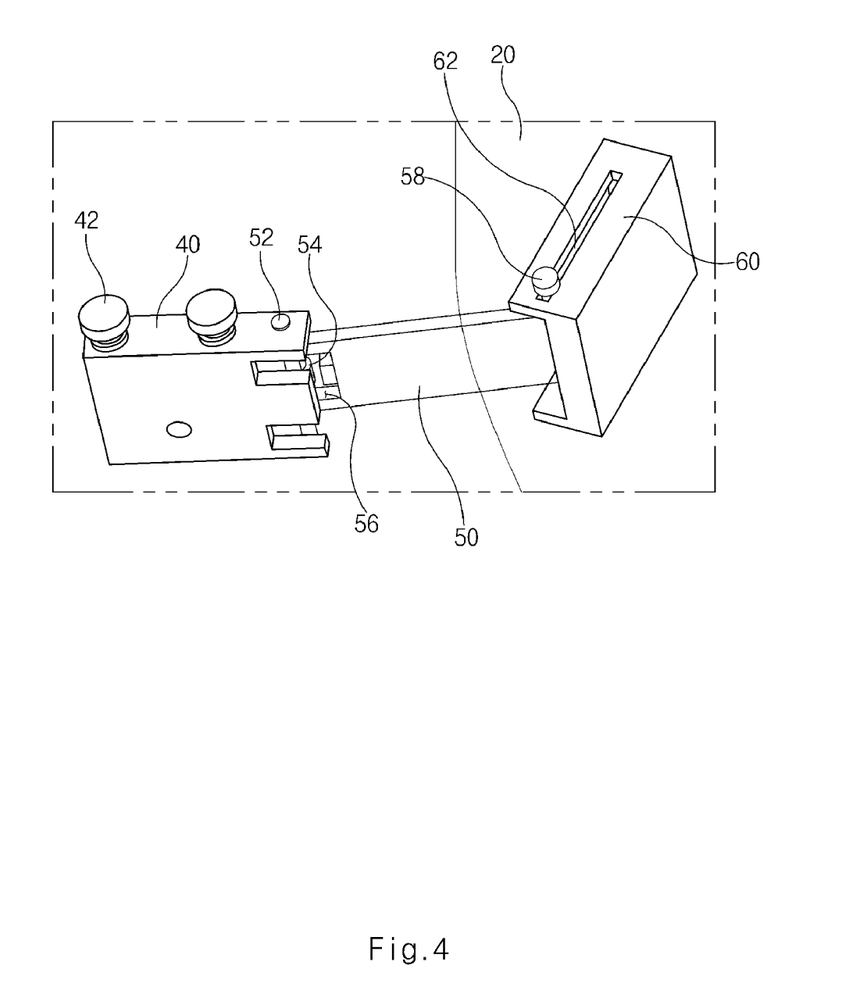
FIG. 4 is a perspective view showing a state in which a sliding door of a vehicle to which a linear center rail structure according to an exemplary embodiment of the present inventive concept is applied is closed.
Figure 5:
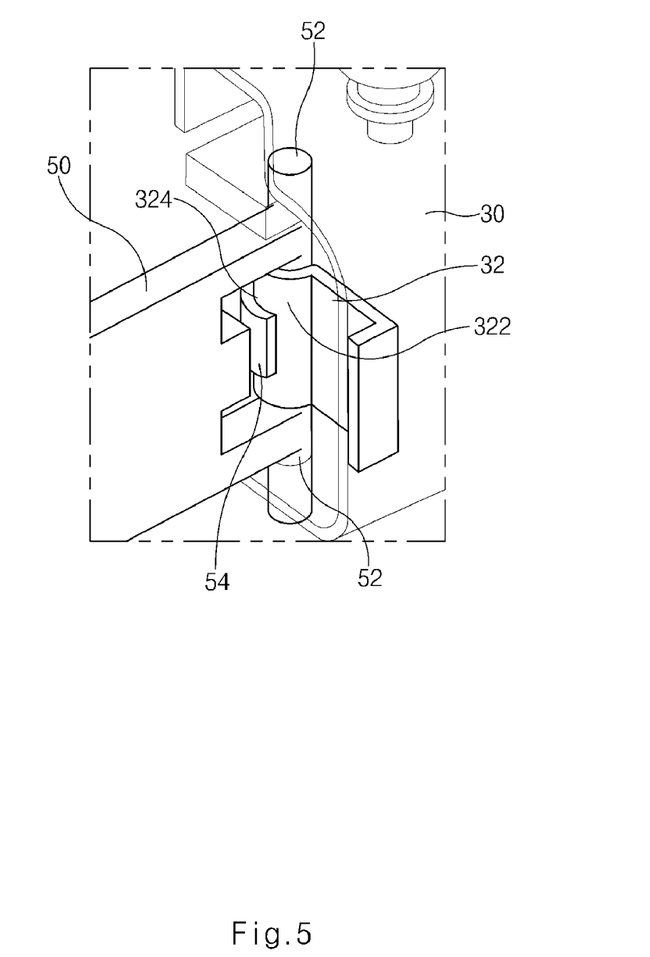
FIG. 5 is a rear perspective view showing a coupled state between a stopper and an arm in the state of FIG. 4.

FIG. 4 is a perspective view showing a state in which a sliding door of a vehicle to which the linear center rail structure according to an exemplary embodiment of the present inventive concept is applied is closed. FIG. 5 is a rear perspective view showing a coupled state between a stopper and an arm in the state of FIG. 4.

In a state in which the sliding door is closed, as shown in FIGS. 4 and 5, the first hinge shaft 52 is received in the stopping grooves 322, the hook 54 is hooked into the hooked groove 324, and the second hinge shaft 58 is positioned at the outermost side of the slots 62 of the base 60.

Figure 6:
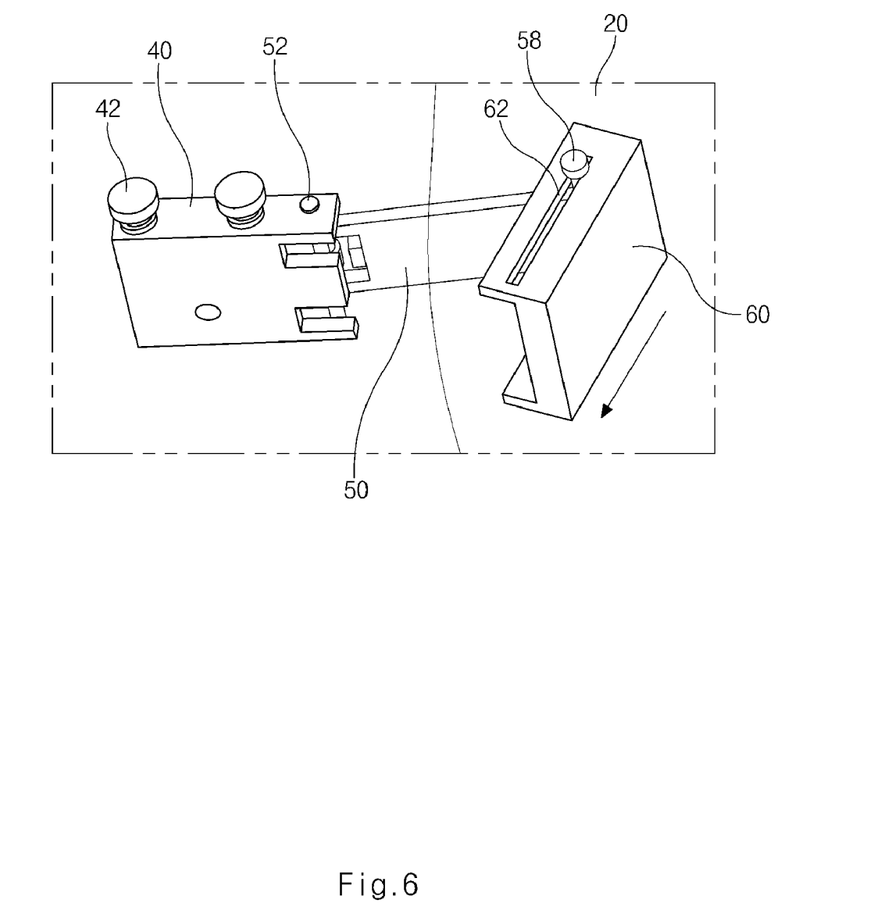
FIG. 6 is a perspective view showing a process in which the sliding door of FIG. 4 moves from a closed state to a pop-up state.
Figure 7:
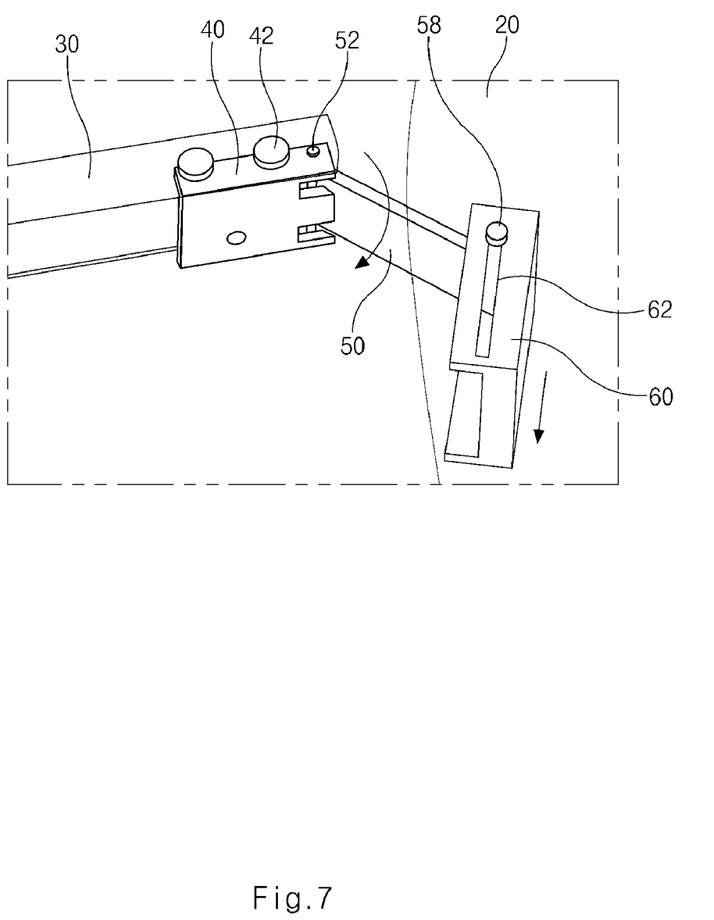
FIG. 7 is a perspective view showing a state immediately before slid-opening the sliding door when the pop-up state of FIG. 6 is completed.

In this state, when the sliding door is opened, a pop-up operation is generated, such that the pop-up operation is performed in two divided sections, i.e., a slot movement section of FIG. 6 and an arm rotation section of FIG. 7.

Figure 8:
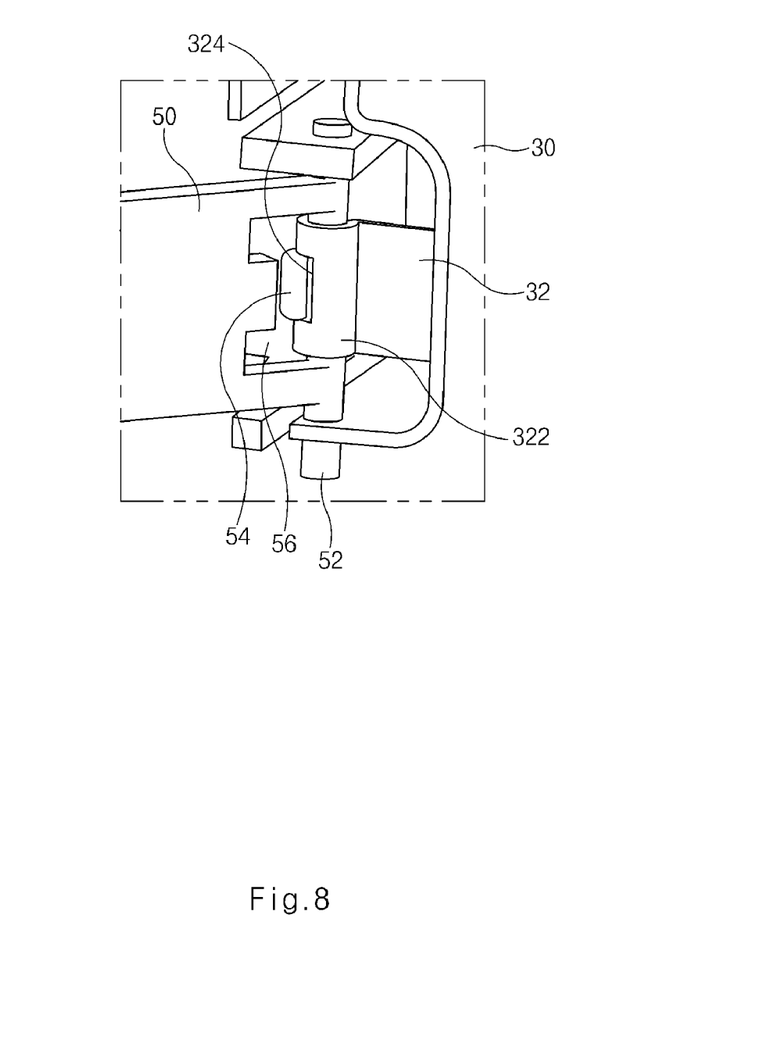
FIG. 8 is a rear perspective view showing a decoupled state between a stopper and an arm in the state of FIG. 7.
Figure 9:
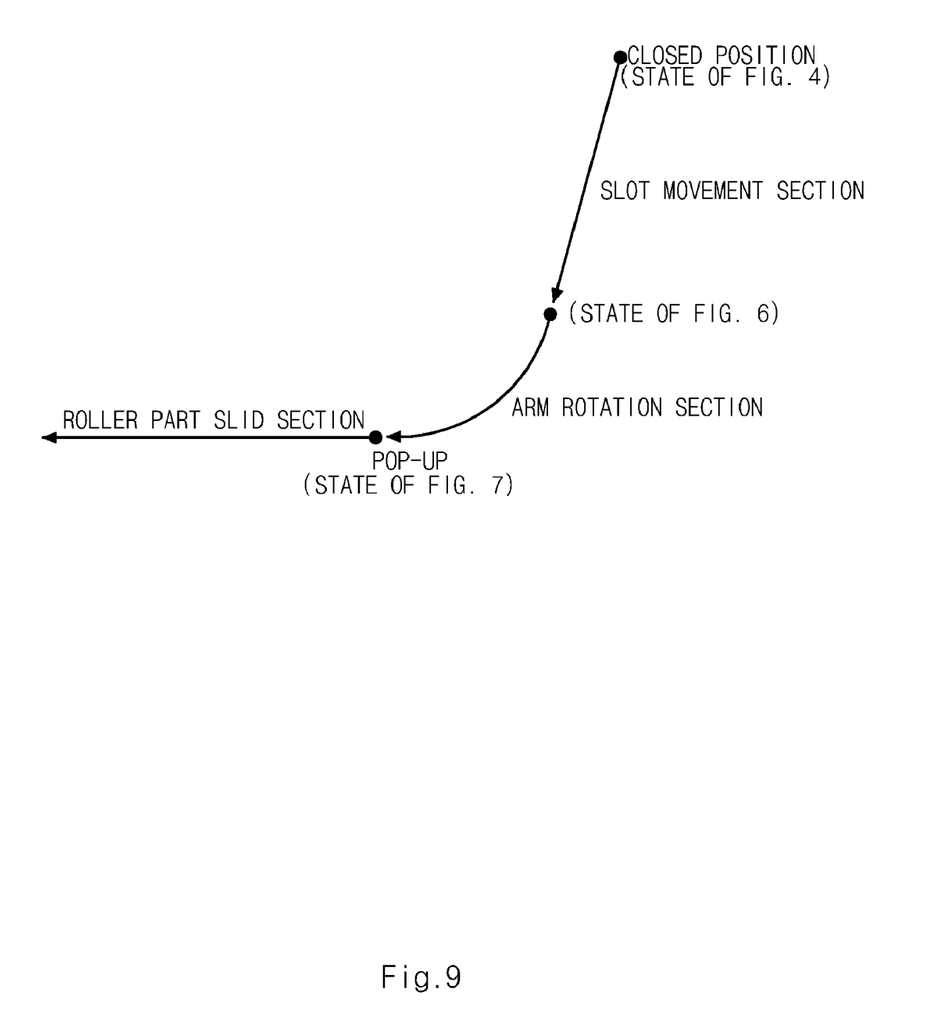
FIG. 9 is a view showing a trajectory of a sliding door according to an exemplary embodiment of the present inventive concept.

FIG. 6 is a perspective view showing a process in which the sliding door of FIG. 4 moves from a closed state to a pop-up state. FIG. 7 is a perspective view showing a state immediately before slide-opening the sliding door when the pop-up state of FIG. 6 is completed. FIG. 8 is a rear perspective view showing a decoupled state between a stopper and an arm in the state of FIG. 7.

In the slot movement section with reference to FIG. 6, the second hinge shaft 58 moves from an outer side end portion of the slot 62 to an inner side end portion thereof (in fact, the base moves from the inner side to the outer side while the second hinge shaft stops) when the sliding door is pushed out from a vehicle body. In this state, as shown in FIG. 6, in which the arm does not yet move, the state, in which the first hinge shaft 52 is received in the stopping grooves 322 and the hook 54 is hooked into the hooked groove 324 as shown in FIG. 5, is maintained.

In this state, as shown in FIG. 6, when the pop-up operation is further performed, since there is no section in which the second hinge shaft 58 can move in the slots, the arm 50 is rotated around the first hinge shaft 52 (see FIG. 7). When the arm 50 is rotated as described above, as shown in FIG. 8, the hook 54 exits from the hooked groove 324 in a state in which the first hinge shaft 52 is still received in the stopping grooves 322.

In this state, as shown in FIG. 8, when the sliding door is pushed rearward, the roller part 40 moves rearward along the center rail 30, and the first hinge shaft 52 exits from the stopping grooves 322 while the roller part 40 starts to move.

Next, a process of closing the sliding door will be described. When the sliding door is pushed forward, the roller part 40 moves forward along the center rail 30, and the first hinge shaft 52 is received in the stopping grooves 322 while colliding with the stopping grooves 322 when the roller part 40 arrives at the end portion of the center rail 30. Therefore, the stopping groove 322 serves as a stopper.

Then, when the sliding door moves from the pop-up position to a closed position, the arm 50 rotates around the first hinge shaft in a reverse direction, and the hook 54 is fitted into the hooked groove 324 in a state in which the first hinge shaft 52 is received in the stopping grooves 322. In this rotation process, since the stopping groove 322 passes through the penetration part 56 of the arm, the interference between the arm 50 and the stopper 32 is not generated.

Then, when the hook 54 is completely fitted into the hooked groove 324 to thereby be no longer rotated, the second hinge shaft 58 moves from the inner side end portion of the slot 62 to the outer side end portion thereof (in fact, the base 60 moves from the outer side to the inner side while the second hinge shaft 58 stops).

As described above, the linear center rail structure according to an exemplary embodiment of the present inventive concept may certainly guide movement of the sliding door in the pop-up direction in spite of using the linear rail.

According to an exemplary embodiment of the present inventive concept, the center rail is configured of only a linear part without an inwardly directed part and a curved part, thereby making it possible to improve dwelling ability and operability in opening or closing the sliding door.

In addition, according to an exemplary embodiment of the present inventive concept, a design layout is optimized, thereby making it possible to improve a degree of freedom in inner and outer designs.

The respective components of the present inventive concept may be appropriately changed in a range in which their functions are not changed, and are not limited to the above-mentioned embodiment, but may be freely changed without departing from the scope and spirit of the present inventive concept defined by the following claims.

What is claimed is:

1. A linear center rail structure for a sliding door, comprising:
    a linear center rail disposed on a side outer panel of a vehicle;
    a roller part guided by the center rail, slid along the center rail, and having hinge holes formed at an end portion thereof;
    a base fixed to a sliding door panel and having slots formed in a pop-up direction of the sliding door panel; and
    an arm having one end at which a first hinge shaft rotatably coupled to the hinge holes of the roller part is disposed and the other end at which a second hinge shaft fitted into the slots of the base to thereby be slidably and rotatably coupled to the base is disposed,
    wherein the first hinge shaft of the arm has a hook, and an end portion of the center rail has a hooked groove, such that when the sliding door moves from a pop-up position to a closed position, the first hinge shaft is rotated in a first direction to allow the hook to be fitted into the hooked groove, and when the sliding door moves from the closed position to the pop-up position the first hinge shaft is rotated in an opposite direction to the first direction to allow the hook to exit from the hooked groove.

2. The linear center rail structure for a sliding door according to claim 1, wherein the center rail has a stopper fixed to an end portion thereof, the stopper defining a limitation of sliding movement of the roller part when the sliding door is at a pop-up position and a closed position.

3. The linear center rail structure for a sliding door according to claim 2, wherein the stopper has stopping grooves receiving the first hinge shaft of the arm therein to receive the first hinge shaft in the stopping grooves when the sliding door is at the pop-up position and the closed position, thereby defining the limitation of the sliding movement of the roller part.

4. The linear center rail structure for a sliding door according to claim 3, wherein an inner side of the first hinge shaft of the arm has a penetration part in order to prevent interference between the arm and the stopping grooves when the first hinge shaft is rotated in a first direction during a period in which the sliding door moves from the pop-up position to the closed position.

5. The linear center rail structure for a sliding door according to claim 1, wherein the slots are formed so as to have an inclined angle rearward in a left and right direction of the sliding door.

* * * * *